Patented Feb. 12, 1924.

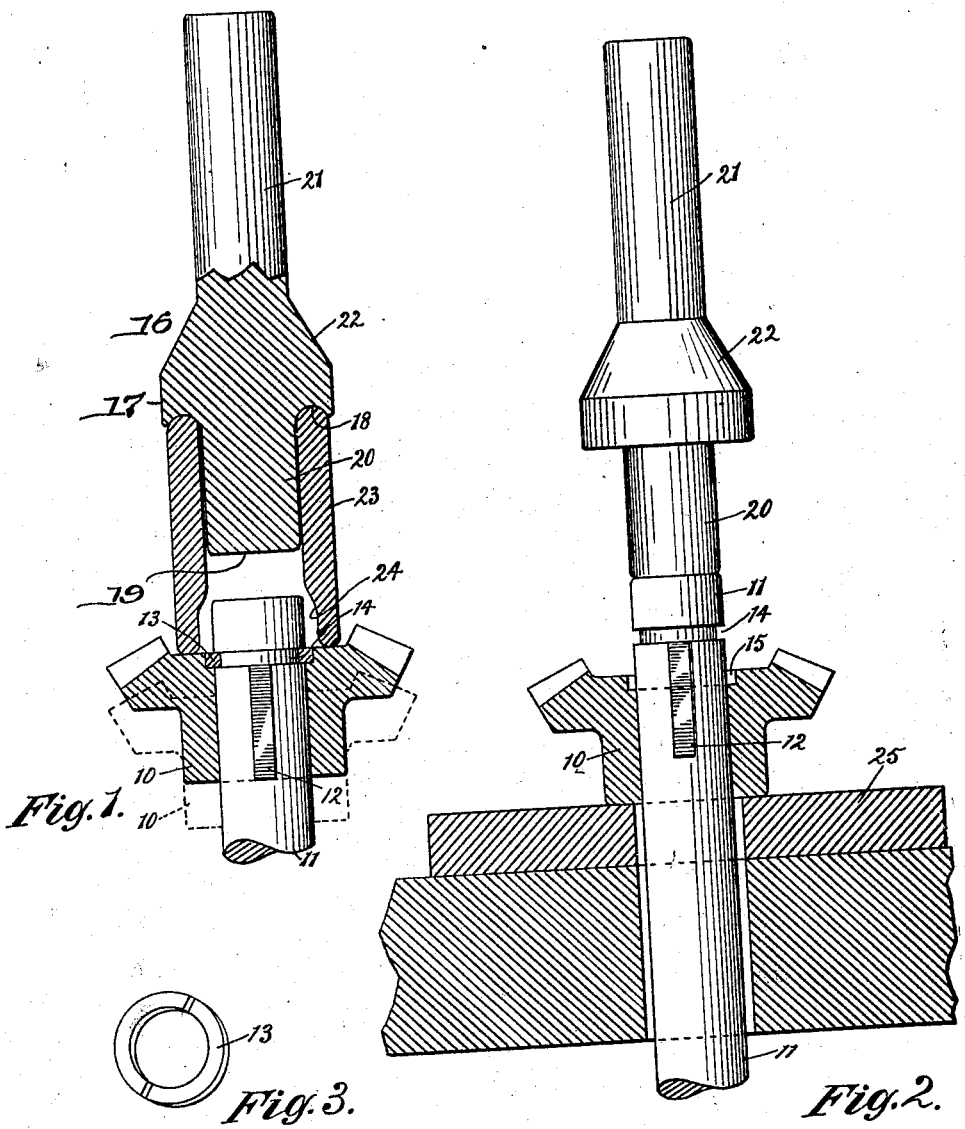

1,483,670

UNITED STATES PATENT OFFICE.

RALPH J. McKEE AND FRED STONEBERG, OF CHICAGO, ILLINOIS, ASSIGNORS TO ZIM MANUFACTURING CO., OF CHICAGO, ILLINOIS, A CORPORATION OF ILLINOIS.

GEAR DRIFT AND BUSHING THEREFOR.

Application filed July 17, 1922. Serial No. 575,706.

*To all whom it may concern:*

Be it known that we, RALPH J. McKEE and FRED STONEBERG, citizens of the United States, and residents of Chicago, county of Cook, and State of Illinois, have invented certain new and useful Improvements in Gear Drifts and Bushing Therefor, of which the following is a specification and which are illustrated in the accompanying drawings, forming a part thereof.

This invention relates to a tool constructed primarily for use in removing the differential bevel gear of a Ford automobile from its mounting on the rear axle shaft or for the removal and remounting of other gears of similar construction. On account of the particular method of mounting this gear, difficulty is frequently experienced in removing the gear from the shaft without injury when it is desired to replace the shaft. The object of the invention is accordingly to provide a simple and inexpensive tool by the use of which the bevel gears on the rear axle shafts of a Ford automobile, or any gears similarly mounted, may be quickly and easily removed from their mounting without damage to the gears or shafts.

In the accompanying drawings—

Fig. 1 is a sectional view partly in elevation showing the tool in position for driving the gear on to the shaft;

Fig. 2 is similar to Fig. 1 but shows the tool in position for driving the shaft out of the gear, and Fig. 3 is a perspective view of a split ring element of the mounting.

In accordance with the construction of the particular mounting to which reference is made, a gear 10 is shown fastened to a shaft 11 by a longitudinal extending key 12 which prevents rotation of the gear on the shaft but which is not relied upon to prevent longitudinal movement of the gear on the shaft. When the shaft is in its operative position, longitudinal movement of the gear 10 inwardly upon the shaft 11, is prevented by the differential housing (not shown). On the other hand, longitudinal movement of the gear outwardly upon the shaft is prevented by a split ring 13 which is positioned in an annular groove 14 in the shaft and projects therefrom so as to provide an annular stop shoulder in front of the gear. Gear 10 is provided with a recess 15 which forms a seat for the projecting portion of the ring 13 and also serves to prevent displacement of the ring from the groove 14.

The invention consists in providing a driving tool or drift constructed preferably of hardened steel capable of withstanding blows from a hammer or sledge and having contact surfaces adapted for selective engagement with the gear and shaft to transmit the impact of the blows to the part engaged without breaking the same or disfiguring the surfaces thereof.

The device chosen to illustrate the invention is shown as comprising a solid cylindrical drift pin 16 having an enlargement 17 intermediate its ends providing a forwardly facing abrupt annular shoulder 18. As the forward end 19 of the pin is intended for engagement with the end of the shaft 11 in driving the shaft out of the gear, all of that part, as 20, of the pin in front of the shoulder 18 is of slightly less diameter than the shaft and this part of the pin is made long enough to follow the shaft through the gear 10. The impact receiving end 21 of the tool, on the other hand, is preferably made of suitable size and length to serve as a handle and this part of the tool tapers gradually into the enlargement 17, as at 22.

For use in driving the gear onto the shaft, a bushing 23 is provided to enclose the forward end portion 20 of the drift pin and transmit the impact from the shoulder 18 to the face of the gear. For this purpose, the bushing is preferably made of a size to fit closely about the said forward end portion of the drift pin while its length is such that it projects beyond the end of the pin for contact with the face of the gear about the protruding end of the shaft 11. Furthermore, to insure that the bushing will clear the shaft at all times, the interior diameter of the bushing may be somewhat increased in the forward end portion thereof, as at 21 (Fig. 1). The exterior diameter of the bushing is preferably uniform throughout and the same as that of the enlargement 22 on the drift pin. When the drift pin and bushing are assembled, the bushing accordingly forms a smooth continuation of the said enlargement. Likewise, to improve the fit of the parts and insure that the contact between the drift pin and bushing shall comprise only the engagement of rounded surfaces, the face of the shoulder 18 is grooved and the adjacent end of the bushing is correspondingly rounded.

To remove the gear, the shaft 11 is held against movement in any convenient manner. The bushing 23 is then applied to the face of the gear, the forward end portion 20 of the drift pin is entered in the bushing and, by driving upon the upper end of the drift pin, the gear is forced down to the position indicated by dotted lines in Fig. 1. This permits removal of the split ring 13. The shaft may now be placed in a ring 25 (Fig. 2) or similar device for supporting the gear and the shaft driven out of the gear by the use of the drift pin 16 applied directly to the end of the shaft. To mount the gear on the shaft requires substantially the same operations in reverse order, the movement of the parts being accomplished in each case without deforming the parts at the place where force is applied.

We claim as our invention:

1. In a gear drifting tool, in combination, a drift pin having a forwardly facing shoulder intermediate its ends and an impact transmitting bushing removably engaging said shoulder and extending beyond the end of said pin.

2. In a gear drifting tool, in combination, a drift pin having a forwardly facing abrupt annular shoulder intermediate its ends and impact transmitting bushing removably fitting the pin in front of the shoulder, the length of the bushing being greater than the length of the pin in front of the shoulder.

3. A gear drifting tool comprising a pin, a collar on said pin, said collar being provided with a forwardly facing recess extending about the same, and an impact transmitting bushing engaging said recess for positioning said bushing, the length of the bushing being greater than the length of the pin in front of said recess.

RALPH J. McKEE.
FRED STONEBERG.